Oct. 10, 1967     G. A. PETERSEN ET AL     3,346,284
SWIVEL CABLE PULLING GRIP AND FILLER
Filed March 30, 1965     2 Sheets-Sheet 1
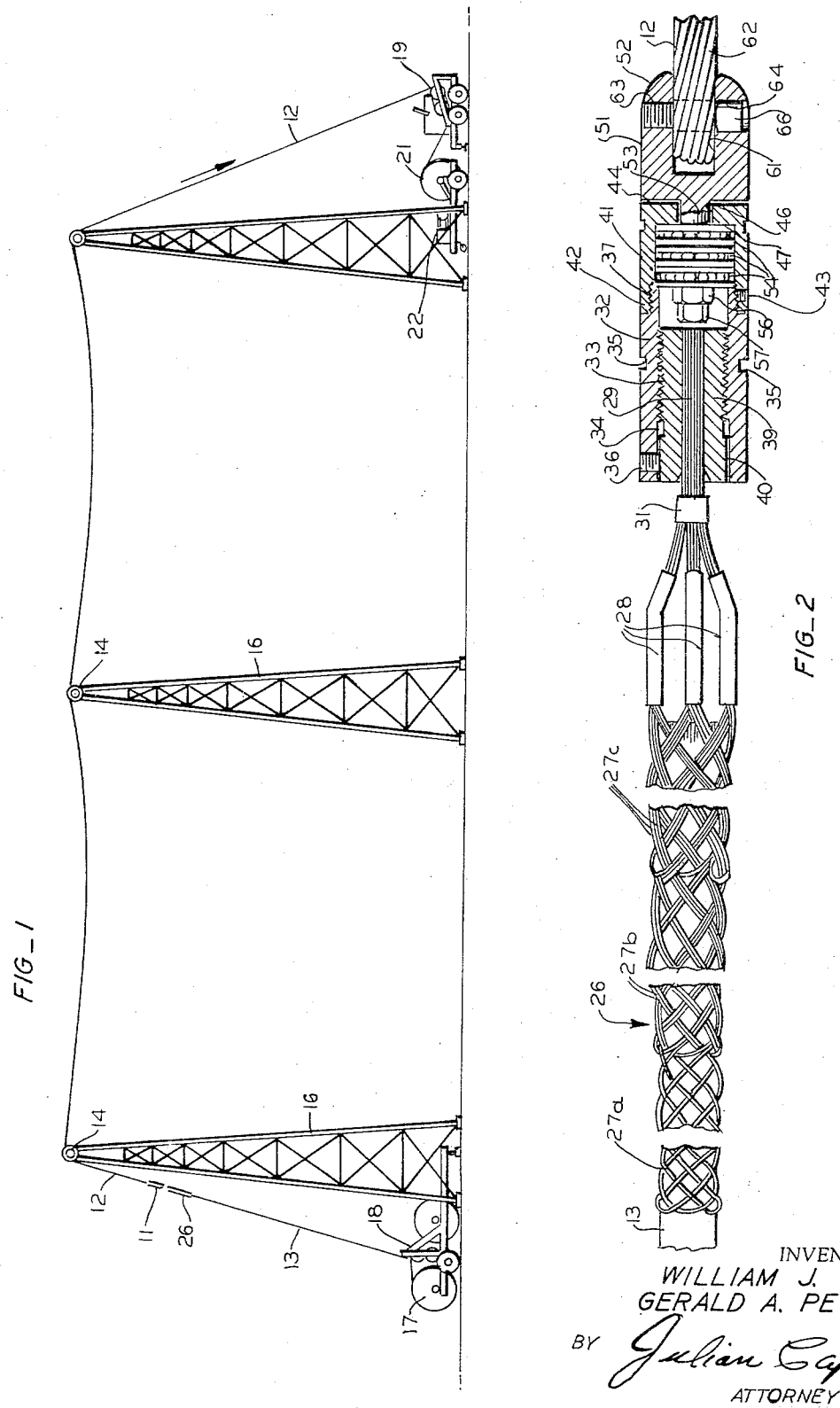
INVENTORS
WILLIAM J. LANUM
GERALD A. PETERSEN
BY Julian Caplan
ATTORNEY Oct. 10, 1967     G. A. PETERSEN ETAL     3,346,284
SWIVEL CABLE PULLING GRIP AND FILLER
Filed March 30, 1965                         2 Sheets-Sheet 2
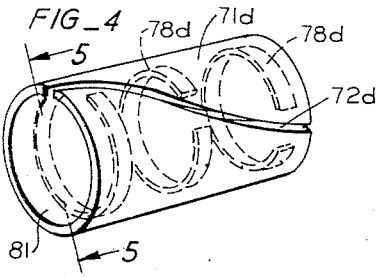
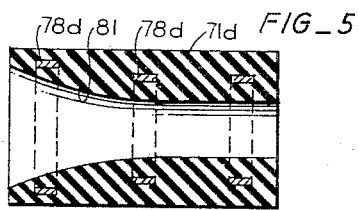
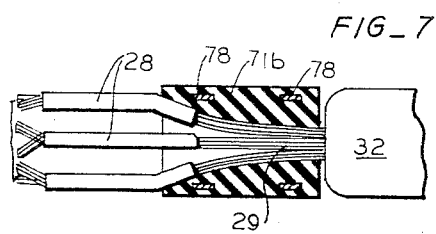
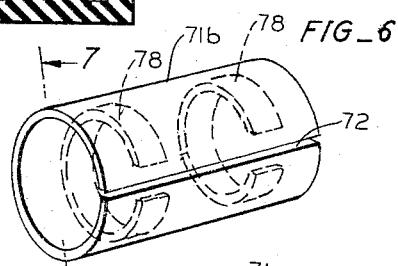
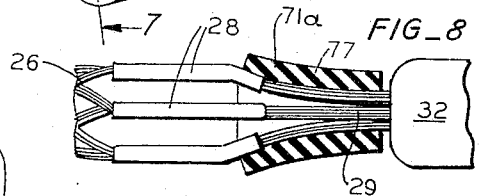
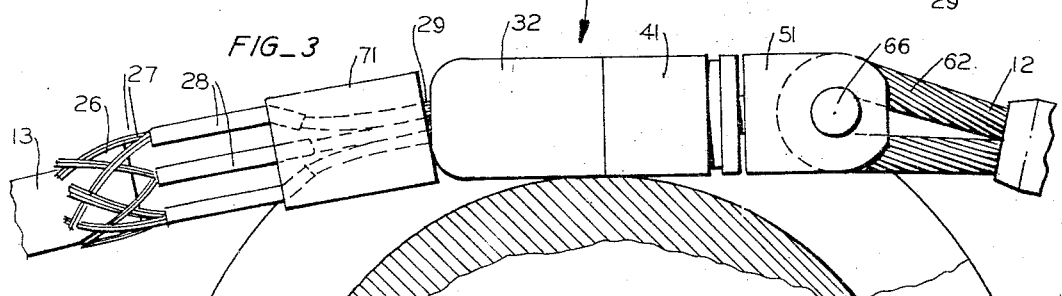
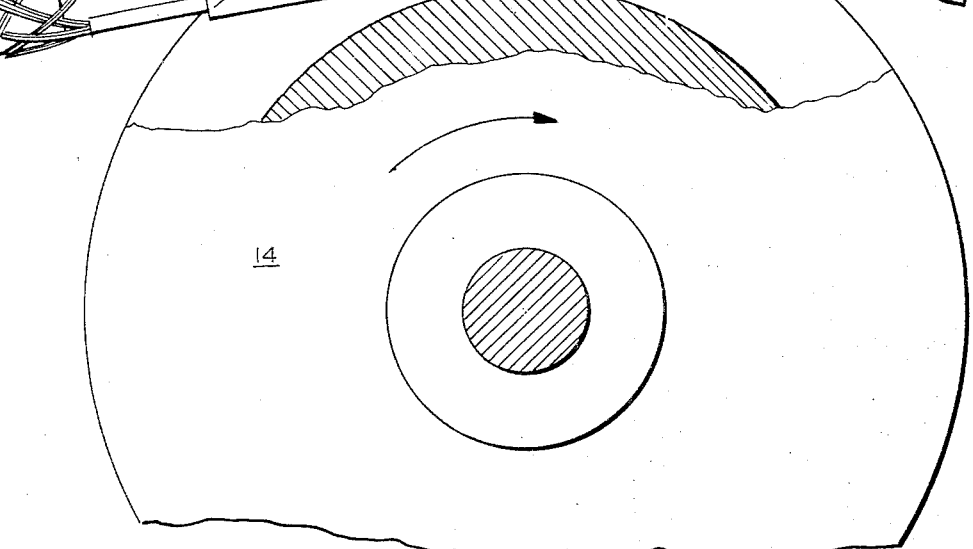
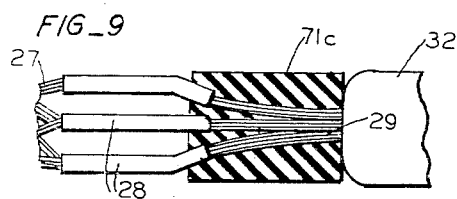
INVENTORS
WILLIAM J. LANUM
GERALD A. PETERSEN
BY
ATTORNEY 3,346,284
SWIVEL CABLE PULLING GRIP AND FILLER
Gerald A. Petersen, Sunnyvale, and William J. Lanum, Concord, Calif., said Petersen assignor of one-half to Anita E. Petersen, Saratoga, Calif.
Filed Mar. 30, 1965, Ser. No. 444,084
10 Claims. (Cl. 287—91)

ABSTRACT OF THE DISCLOSURE

A cable is attached to a swivel connector by means of a stocking grip wherein the wires of the grip are gathered in a small diameter bundle of extended length between the end of the cable and the swivel casing. A resilient filler sleeve of an outside diameter about equal to that of the cable and of the casing fits over the small diameter bundle. Abrupt transitions from one diameter to another as the cable passes around bull wheels or over stringing sheaves are avoided.

---

This invention relates to a new and improved swivel cable pulling grip. More particularly, the present invention relates to a stocking-type cable grip wherein the wires of the grip are bundled together in an elongated central small diameter bundle one end of which is received inside the hollow body of a swivel connector. The connector is provided with means for attachment to a pulling cable. Thus the pulling strain of the pulling cable is transmitted to the conductor, but relative rotation of the conductor and pulling cable is freely permitted through the instrumentality of the swivel. A further feature of the invention is the provision of a filler or spacer encircling the bundle of wires of the grip between the cable and the swivel and reducing the possibility of malfunction of the apparatus attributable to abrupt changes in external diameter of the consecutive parts.

The connector hereinafter described in detail is particularly useful during tension stringing of electrical conductors. A pulling line of wire rope is attached to the leading end of the conductor and is run over stringing sheaves attached to the cross-arms of poles or towers. Any damage which may occur by reason of contact with the ground is absorbed by the pulling rope. The function of the pulling line is to pull the conductor through the stringing sheaves. In the course of the operation, a pair of bull wheels is used, one at each end of the line. The conductor is wound from its reel through the tension bull wheel which applies a braking force to the pulling of the conductor while the wire rope is rewound through a puller bull wheel and then back on to a reel for reuse. The bull wheel of the puller is equipped with power for turning with a force greater than the braking action at the other end of the line, and hence if the equipment is properly operated the conductor never touches the ground at any time during the stringing operation. Damage to the conductor and consequent corona loss and radio interference at high voltages is avoided. Further, the use of tension-stringing avoids obstructions such as pre-existing power and telephone lines, roads, streets and railroad tracks which must be traversed by the line being strung.

The pulling wire rope and the conductor being of quite different construction, tend to turn about the central axis relative to each other and this turning may cause damage to either the conductor or to the rope. To avoid transmitting the turning motion of one of the wires to the other, a swivel is installed between the rope and the conductor to permit the two to turn freely in opposite directions or at different speeds in the same direction. The present invention provides an improved swivel connection for this important purpose.

In one form of the invention, the wire strands of a conventional Kellem's type stocking cable grip are gathered together in a single central forwardly projecting bundle which is attached at its forward end to a compression sleeve, said sleeve being received in the interior of a hollow swivel body. Heretofore, other means were employed to attach the stocking grip to the swivel connector, one of the most common being the formation of an eye in the end of the cable grip which eye was received in a slot in the swivel connector and secured in place by a transverse pin through the eye. The present invention eliminates the necessity of forming the eye in the strands of the grip. The outside diameter of the bundle of wires is considerably smaller than either the outside diameter of the stocking grip when applied to the exterior of a conductor or to the outside diameter of the swivel portion of the device heretofore mentioned. In use the connector passes around the pulley of a stringing sheave or around the bull wheels of the tensioner or brake. The abrupt changes in external diameter result in irregular movement, jerks and bending strain, which may reduce the life of the connector or cause it to leave its grooves. Accordingly, an important feature of the invention hereinafter described is the provision of a spacer which fits around the small diameter bundle of wires in a sleeve-like manner so that the effective external diameter of all of the parts is essentially the same or transitions from one diameter to another are less abrupt.

A still further feature of the invention is the facility with which the sleeve may be installed and removed.

Still another feature of the invention is the fact that means is provided to prevent transmission of stresses imposed between the pulling cable and the conductor from rupturing the sleeve.

Still another feature of the invention is that in a preferred form of the invention the filler sleeve is split longitudinally to facilitate installation and removal, and also to make possible inspection of the bundle of wires. It will be understood that if the bundle of wires is frayed or broken serious damage may result. By visual inspection through the slit in the sleeve the possibility of use of a damaged connecter is largely eliminated.

Other objects of the present invention will become apparent upon reading the following specification and referring to the accompanying drawings in which similar characters of reference represent corresponding parts in each of the several views.

In the drawings:

FIG. 1 is a schematic side elevation of a cable stringing system.

FIG. 2 is a longitudinal sectional view through a connector in accordance with one form of the invention.

FIG. 3 is a fragmentary enlarged view of a sheave, connector, filler and associated structure partially broken away in section.

FIG. 4 is a perspective view of a spacer sleeve.

FIG. 5 is a sectional view taken substantially along line 5—5 of FIG. 4.

FIG. 6 is a view similar to FIG. 4 of a modification.

FIG. 7 is a sectional view substantially along line 7—7 of FIG. 6, and showing a portion of the associated structure in place.

FIGS. 8 and 9 are views similar to FIG. 7 of further modifications.

As shown in FIG. 1, there is provided a swivel connector 11 installed between a cable 12 and conductor 13. At the commencement of the tension-stringing operation, cable 12 is run through sheaves 14 on transmission tower 16 or the like. The rearward end of pulling rope 12 is connected by connector 11 to the forward end of conductor 13. Conductor 13 is received wound on its reel 17 which passes through a cable tensioner machine 18 which applies a braking force to paying out of the conductor. The forward end of the wire rope 12 is received in a tension bull wheel puller machine 19 which applies a pulling force greater than the braking force of machine 18 and the wire is then rewound on a receiving reel 21 by means of reel winder 22. The details of machines 18, 19 and 22 form no part of the present invention and are well-known in this art.

One of the purposes of the present invention is to permit rotation of wire rope 12 relative to conductor 13 by means of a swivel connection so that the rotation of one member is not transmitted to the other with consequent damage to one or the other of the wires. A further and fundamental purpose of the invention is to transmit the pulling force from the rope 12 to the conductor 13 without damage to the conductor or the rope and without danger of disengagement of the two members.

A conventional means of pulling conductors, such as conductor 13, is a cable grip known in the trade as a "Kellem's" grip or stocking grip 26. Such a grip 26 is formed of reticulated wires 27 woven, as shown in the accompanying drawings, in helical patterns which intersect in diamond-shaped interstices. As shown in the accompanying drawings, the number of strands of wire may increase progressively from the tail of the stocking connector towards the swivel. Thus, as is best shown in FIG. 2, adjacent the tail of the connector, there are single wires 27a, next double strands of wire 27b and, nearest the swivel portion, triple strands of wire 27c. It will be understood, of course, that single strands may be used throughout or that other combinations of wire may be used. A feature of grip 26 is that an endwise pull applied to the grip tends to lengthen the grip and as it lengthens its construction causes a reduction in the internal diameter of the grip. Accordingly, the greater the tension applied to the grip in an axial direction, the tighter it tends to grip the conductor 13 over which it is installed. Another feature of this type grip is the fact that if the rear end thereof is forced toward the forward end, the grip expands in internal diameter permitting it to be slipped over the end of the conductor. Release of the inward pressure on the trailing end of the grip causes it to contract and to engage the exterior face of the conductor. Pulling of the forward end of the grip then results in a firmer attachment of the grip to the conductor.

In accordance with the present invention, pluralities of strands of wire 27 are secured together by means of first sleeves 28. As shown herein, there are two strands 27 in each sleeve 28 but the number thereof is subject to wide variation. The pluralities of strands held by sleeves 28 are brought together in a single, central bundle 29 extending axially forwardly and prevented from splaying outwardly by second sleeve 31. Thus, there is a forwardly-extending bundle of wires 29 of fairly extended length at the forward end of grip 26, said bundle replacing the conventional eye formed on stocking grips heretofore used.

The swivel connector hereinafter described in detail is an improvement on U.S. Patent No. 2,387,599. Said swivel connection has a three-part casing. The first casing part 32 is hollow, being cylindrical on its exterior and at its rearward end 33 being spherical. Spanner wrench dimples 35 are formed on the exterior of casing 32. Interiorly of casing part 32 there is a cylindrical bore 34 and, at the rearward end, a shoulder 36. The forward end of first casing portion 32 is of reduced diameter and threaded as indicated by reference numeral 37. The opposite end 33 is open. Interiorly of hollow body 32 is a swedge-type compression sleeve 39 formed at its forward end with external thread which mates with internal thread in bore 34. The rearward end of compression sleeve 39 is unthreaded and of slightly lesser diameter than bore 33. Intermediate portion 34 is necked in. A setscrew 36 in the rearward end of body portion 32 engages rear portion 40 and holds the compression sleeve against rotation within body 32.

The second casing member 41 has its rearward end 42 internally threaded to engage threaded end 37 of first casing section 32. A set screw 43 holds the two parts against rotation relative to each other when in assembled position. Casing section 41 is also hollow and has a flat transverse forward end 44 formed with an aperture 46. A shoulder 47 is provided at the forward end of the hollow in casing section 41.

The third casing section 51 is solid, having a cylindrical body and a spherical forward end 52. Rearwardly of body 51 is a stem 53 which passes through aperture 46 and extends interiorly in the hollow of casing section 41. The rearward end of stem 53 is threaded. A plurality of thrust roller bearings 54 is received in the bore of casing section 41 and abuts shoulder 47, the outer races of the bearings being fixed for rotation with casing 41 (and 32). A nut 56 and lock nut 57 on the threaded rearward end of stem 53 secure the inner races of bearings 54 for rotation with casing section 51. Thus, casing section 51 may swivel or rotate relative to casing section 41–32, but the thrust of the pull exerted on section 51 is absorbed by the thrust bearings 54.

A preferred means of securing the connector to rope 12 is the formation of a longitudinal slot 61 in the forward end of casing section 51 being dimensioned large enough to receive an eye splice 62 on the rearward end of rope 12. Transversely to slot 61 is a threaded hole 63 and, on the opposite side of slot 61, a counter bore hole 64. A pin 66 extends through bore 64, through the eye 62 in rope 12, thereby bridging across the slot 61 and is threaded into hole 63. When thus in place, pin 66 secures the rope 12 to the splice.

In assembly of the apparatus, stocking grip 26 is compressed endwise and slipped over the leading end of conductor 13. Compression sleeve 39 is screwed into the rearward end of the swivel section 32 to the position shown in FIG. 2 and setscrew 36 tightened to hold the sleeve in position.

As pull is transmitted to rope 12 and braking action to conductor 13, the cable grip 26 firmly engages the conductor 13. The pull on the rope 12 is transmitted first through pin 66 to third casing 51 thence through the thrust bearings 54 to casing members 41–32, thence through sleeve 39 through the bundle 29 and to the cable grip 26. The rope 12 may rotate relative to conductor 13 without interference, and rotation of the two members 12 and 13, relative to each other, is not cross-transmitted. It will be noted that sleeve 39 turns relative to section 51, but not relative to sections 32 and 41.

Directing attention to FIG. 3, wherein a stringing sheave 14 is partially illustrated, it will be seen that passage of the connector over the sheave imposes some bending stress upon the bundle of conductors 29, and further that the abrupt changes in external diameter from swivel connector casing 32–41 to bundle 29 and then to stocking grip 26 may result in an irregular, jerky movement. The same situation obtains when the device passes around the bull wheels of the tensioner 18 or puller 21.

To reduce the undesirable effects of the external diameter changes, a resilient filler or sleeve 71 is positioned over bundle 29 and the leading edges of first sleeves 28. Filler 71 has an external diameter substantially equal to that of swivel connector sections 32, 41, 51 and also approximately equal to the external diameter of stocking grip 26 when positioned over conductor 13. Where the external diameters of swivel connector section 32 and stocking grip 26 are dissimilar, the sleeve 71 may be of a diameter intermediate the two, or may have an external taper. As best shown in FIG. 3, the use of the sleeve 71 reduces abrupt flexure of bundle 29 tending to fracture the same. In other words, the abruptness of the bending of bundle 29 is reduced by the presence of the sleeve 71. A further effect of the sleeve is to eliminate radical external diameter changes which tend to cause a jerky movement which may not only damage the connector but tend to cause the connector to jump from the groove of the sheave 14.

Sleeve 71 may be fabricated in a plurality of different ways. Directing attention first to FIG. 8, sleeve 71a has an external diameter approximately equal to that of casing section 32 and an internal diameter such as to fit around bundle 29 and the leading edges of first sleeves 28. As shown in FIGS. 6 and 7, sleeve 71b may be slit longitudinally along slit 72 to enable the sleeve to slip over bundle 29.

FIG. 9 shows a further modification wherein the filler 71c is vulcanized around the metallic portions which are imbedded therein.

In the modification shown in FIG. 8, the band 71a has a tapered exterior 77. It will be appreciated that, when stress is applied in pulling the conductor with a pulling cable, the angular position of the wires 29 shown in FIG. 4 becomes distorted as the wires tend to assume a straight line. The filler 71a is sufficiently flexible so that it will expand approximately midway of its length to accommodate such movement of the wire. The tapered shape of sleeve 71c is particularly desirable when the diameter of casing 32 differs considerably from that of stocking grip 26 when in place over conductor 13, it being understood that the sizes of conductor 13 are subject to wide variation.

FIG. 6 shows modified filler 71c which is formed with a longitudinal slit 72. To hold the device together, C-shaped spring elements 78 may be embedded in filler 71b and function to bias the edges of slit 72 together when the device is in place. Elements 78 may be formed of spring steel or other resilient material. Slit 72 facilitates installation or removal of the filler. Further, visual inspection of the condition of bundle 29 through slit 72 reduces the danger of unintentionally using a damaged grip.

FIGS. 4 and 5 show still a different filler 71d which may be slipped over the bundle 29. In this form, slit 72d is helical rather than straight as in FIG. 6. A plurality of C-shaped spring elements 78d is imbedded in filler 71d, the openings of the elements 78d coinciding with the helical slit 72d. As shown, one end of filler 71d is thinner than the other to accommodate the splayed configuration of bundle 29 as it increases in diameter from swivel casing 32 to grip 26; expressed in other terms, the interior 81 flares outward toward the left as viewed in FIG. 5.

Although the foregoing invention has been described in some detail, by way of illustration and example for purposes of understanding, it is understood that certain changes and modifications may be practiced within the spirit of the invention and scope of the appended claims.

What is claimed is:

1. A swivel connector cable grip comprising a swivel having a casing, an elongated stocking-type grip formed of a plurality of reticulated wires gathered in a forward extending bundle of wires having an outside diameter substantially less than the outside diameters of said casing and of said grip, means for securing said bundle to said casing, and a resilient filler sleeve over said bundle and having an outside diameter substantially greater than that of said bundle, said filler being split longitudinally for installation over said bundle, and means for holding the edges of said slit close together.

2. The combination of claim 1, in which said means comprises at least one C-shaped resilient metallic member imbedded in said filler.

3. The combination of claim 1, in which said filler is vulcanized to said bundle.

4. A swivel connector comprising a stocking grip formed of a plurality of wires braided in a reticulated pattern sleeve whereby upon application of tension in a longitudinal direction said sleeve contracts to grip a cable within said sleeve, said wires at one end of said grip extending forward in an elongated bundle of substantially lesser cross-section than said sleeve, a compression sleeve of annular shape fixed to the forward end of said bundle, said compression sleeve being threaded on its exterior, and a swivel connector receiving said compression sleeve in threaded engagement, said connector having a hollow first member threaded to receive said compression sleeve, a hollow second member non-rotatively fixed to said first member, said hollow members and said compression sleeve being non-rotative in assembled position of said connection, a third member rotatable relative to said first and second members, said third member having means for attachment to a pulling cable, a stud extending into said second member, and thrust bearing means within said second member rotatively supporting said stud in said second member, and a resilient filler sleeve around said elongated bundle of wires, said filler sleeve having an outside diameter substantially greater than that of said bundle, said filler being slit for installation of said bundle, and at least one C-shaped resilient metallic member incorporated in said filler sleeve and biasing the split of said sleeve closed.

5. A swivel connector cable grip comprising a swivel having a casing, an elongated stocking-type grip formed of a plurality of reticulated wires gathered in a forward extending bundle of wires having an outside diameter substantially less than the outside diameters of said casing and of said grip, means for securing said bundle to said casing, a resilient filler sleeve over said bundle and having an outside diameter substantially greater than that of said bundle, said filler being split along a helical parting plane and at least one C-shaped resilient metallic member imbedded in said filler to hold the edges of said slit close together.

6. A swivel connector cable grip comprising a swivel having a casing, an elongated stocking-type grip formed of a plurality of recticulated wires gathered in a forward extending bundle of wires having an outside diameter substantially less than the outside diameters of said casing and of said grip, means for securing said bundle to said casing, a resilient filler sleeve over said bundle, a conductor having a diameter substantially greater than said bundle, said grip fitting over and gripping the end of said conductor nearest said casing, said resilient filler sleeve having an outside diameter, substantially greater than said bundle and about equal to that of said casing and of said conductor and filling the space between said end of said conductor and said casing, whereby the external diameter of said conductor, sleeve and casing are all substantially the same without substantial gaps therebetween.

7. The combination of claim 6, in which said filler is split along a helical parting plane.

8. The combination of claim 6, in which the exterior of said filler is tapered.

9. The combination of claim 6, in which the hole in the interior of said filler is tapered.

10. The combination of claim 6, in which said wires are gathered into a plurality of groups of wires and said groups of wires into said bundle and which further comprises a metallic second sleeve around each said group, said second sleeve being angularly shaped.

References Cited

UNITED STATES PATENTS

| | | | |
|---|---|---|---|
| 608,886 | 8/1898 | Marvel | 24—123 X |
| 836,882 | 11/1906 | Hoffman | 24—123 |
| 1,994,674 | 3/1935 | Van Inwagen | 24—123.5 |
| 2,229,849 | 1/1941 | Heidebrecht. | |
| 2,463,116 | 3/1949 | Lewis | 24—123.5 |
| 2,503,814 | 4/1950 | Flagler | 287—91 X |
| 2,574,249 | 11/1951 | Crowson et al. | 287—111 |
| 2,766,501 | 10/1056 | Kellems | 24—123.5 |
| 3,249,376 | 5/1966 | Lanum | 287—91 |

FOREIGN PATENTS 240,655　5/1946　Switzerland.

CARL W. TOMLIN, *Primary Examiner.*

A. V. KUNDRAT, *Assistant Examiner.*

UNITED STATES PATENT OFFICE
CERTIFICATE OF CORRECTION

Patent No. 3,346,284  
October 10, 1967

Gerald A. Petersen et al.

It is hereby certified that error appears in the above numbered patent requiring correction and that the said Letters Patent should read as corrected below.

In the heading to the printed specification, lines 4 and 5, for "said Petersen assignor of one-half to Anita E. Petersen, Saratoga, Calif." read -- assignors, by direct and mesne assignments, of one-half to said Gerald A. Petersen and one-half to Anita E. Petersen, Saratoga, Calif.

Signed and sealed this 29th day of October 1968.

(SEAL)  
Attest:

Edward M. Fletcher, Jr.  
Attesting Officer

EDWARD J. BRENNER  
Commissioner of Patents